United States Patent Office.

EDWARD B. BOOTH, OF ST. LOUIS, MISSOURI.

Letters Patent No. 73,225, dated January 14, 1868.

IMPROVED SHEEP-WASH.

*The Schedule referred to in these Letters Patent and making part of the same.*

TO ALL WHOM IT MAY CONCERN:

Be it known that I, EDWARD B. BOOTH, of the city of St. Louis, county of St. Louis, and State of Missouri, have invented a new and useful Sheep-Wash, of which the following is a full, clear, and exact description.

The object of my invention is to produce a liquid compound that will keep the skin of sheep in a healthy condition, free them from scab and vermin, and keep the wool clear of vermin.

I take one hundred (100) pounds of tobacco, refuse, stems, &c., and boil it in fifty (50) gallons of water long enough to produce forty (40) gallons of the extract of tobacco, which will be from one to six hours, according to the degree of heat and strength of the tobacco. While the liquid is hot I add to it gradually common pulverized chalk, till effervescence ceases. Then, when this mixture is cool, I take one (1) gallon of tersulphide of calcium, prepared in the usual way, and mix it thoroughly with this.

When the compound is to be applied, one pint must be diluted with one gallon of water, and then the sheep washed with or immersed in it.

As this is equally efficacious when applied to cattle and other animals, I do not intend to limit myself to its application to sheep.

What I claim as my invention, and desire to secure by Letters Patent, is—

A sheep-wash composed of the ingredients above named, or their equivalents.

EDW'D B. BOOTH.

Witnesses:
SAM'L S. BOYD,
HENRY T. CARTER.